United States Patent [19]

Redl et al.

[11] Patent Number: 4,928,200
[45] Date of Patent: May 22, 1990

[54] OVERCURRENT PROTECTION FOR SWITCHING MODE POWER CONVERTER

[75] Inventors: Richard Redl, Concord; Nathan O. Sokal, Lexington, both of Mass.

[73] Assignee: Cherry Semiconductor Corporation, East Greenwich, R.I.

[21] Appl. No.: 106,698

[22] Filed: Oct. 6, 1987

Related U.S. Application Data

[63] Continuation-in-part of Ser. No. 34,098, Apr. 2, 1987, Pat. No. 4819122.

[51] Int. Cl.⁵ .............................................. H02H 7/12
[52] U.S. Cl. ......................................... 361/93; 363/56
[58] Field of Search ....................... 361/93, 94, 87, 86, 361/85, 96, 95, 18; 323/282–285; 363/56, 74, 78

[56] References Cited

U.S. PATENT DOCUMENTS

| | | | |
|---|---|---|---|
| 3,701,937 | 10/1972 | Combs | 363/56 X |
| 3,859,586 | 1/1975 | Wadlington | 363/56 |
| 3,914,667 | 10/1975 | Waldron | |
| 4,073,004 | 2/1978 | Chambers et al. | 361/90 X |
| 4,161,761 | 7/1979 | Morgan | 361/94 |
| 4,180,842 | 12/1979 | Keeney | |
| 4,236,187 | 11/1980 | Mochizuki et al. | |
| 4,330,816 | 5/1982 | Imazeki et al. | 363/56 |
| 4,357,572 | 11/1982 | Anderson et al. | 323/286 |
| 4,386,384 | 5/1983 | Moran | 361/94 |
| 4,390,920 | 6/1983 | Lau | 361/94 X |
| 4,414,598 | 11/1983 | Nowell | 361/93 X |
| 4,420,789 | 12/1983 | Breen | 361/94 |
| 4,428,016 | 1/1984 | Brasfield | 361/93 X |
| 4,482,930 | 11/1984 | Peterson et al. | 361/94 |
| 4,524,412 | 6/1985 | Eng | 363/56 |
| 4,528,608 | 7/1985 | Anderson et al. | 361/94 X |
| 4,570,199 | 2/1986 | Morishita et al. | |
| 4,586,120 | 4/1986 | Malik et al. | 363/56 X |
| 4,631,653 | 12/1986 | Small | |
| 4,719,559 | 1/1988 | Sokal et al. | |
| 4,761,702 | 9/1988 | Pinard | 361/18 |
| 4,819,122 | 4/1989 | Gontowski, Jr. | 361/93 |

OTHER PUBLICATIONS

Comparative Analysis of Overload Protection Methods for Switching-Mode Voltage Regulators by R. Redl Sep. 1977.

Primary Examiner—William M. Shoop, Jr.
Assistant Examiner—A. Jonathan Wysocki
Attorney, Agent, or Firm—Robert M. Asher

[57] ABSTRACT

A circuit for decreasing the minimum duty ratio of a switching element in a power converter in response to a signal indicating that sensed current exceeds a second threshold. The circuit turns off the switching element when the sensed current exceeds a first threshold. The minimum duty ratio may be decreased, for example by increasing the period of the switching element or by increasing the "off" time of the switching element. The circuit protects against current runaway.

4 Claims, 3 Drawing Sheets

OVERCURRENT PROTECTION FOR SWITCHING MODE POWER CONVERTER

CROSS-REFERENCE TO RELATED APPLICATION

This application is a continuation-in-part of co-pending application Ser. No. 34,098, filed Apr. 2, 1987 entitled OVER-CURRENT TIMER MODULATOR which was issued on Apr. 4, 1989 as U.S. Pat. No. 4,819,122.

BACKGROUND OF THE INVENTION

The invention is directed to an overload-protection circuit for use in switching-mode power converters. In particular, the invention is directed to a circuit for modulating the "off" time or the pulse repetition period of the switching element of the power converter, in response to an excessive switch current.

Overload protection is based on sensing the instantaneous current in the switching element (or, alternatively, in a filter inductor or energy-storage inductor which is coupled to the switching element), and on turning off the switching element as soon as possible if that current exceeds a chosen first threshold value. There are unavoidable delays in the circuits which perform the current-sensing, the comparison of the sensed current against the threshold, and the subsequent turn-off of the switching element. The current will continue to increase during that delay time. Thus, the peak value of the current will be somewhat higher than the first threshold value. The switch is next turned on at the next clock pulse for the case of a constant-frequency peak-current controller, or after a delay time set by an "off" pulse generator circuit for the case of a constant-"off"-time peak-current controller.

Short-circuit-current-runaway is the most serious hazard of overload-protection methods which use the constant-frequency or constant-"off"-time method of peak-current control. The runaway shows up in the output characteristic (output voltage plotted vs. output current) as a long tail of high output current as the converter output voltage collapses toward zero due to overload.

The physical reason for the short-circuit-runaway is that the minimum "on" time of the switch cannot decrease below the difference between the turn-off and turn-on delay times. This sets a minimum possible duty ratio $D_{min}$ for the converter, for any given switching frequency or any given "off" time.

The result of the current runaway is that the actual short-circuit current can be much larger than the value commanded by the first threshold signal. The difference between the actual value and the commanded value depends on the circuit parameters; in practical cases, it can be as much as an order of magnitude. That much difference can result in saturation of the magnetics, and overheating and eventual destruction of the power semiconductor devices in the power converter.

One known solution to the problem is to combine the constant-frequency or constant-"off"-time pulse-by-pulse protection with soft-start protection using PWM or peak-current-commanding control, as described by the inventors in "Overload Protection Methods for Switching-Mode DC/DC Converters: Classification, Analysis, and Improvements," PESC 87 Record, 18th Annual IEEE Power Electronics Specialists Conference, Blacksburg, VA, June 21-26, 1987 (IEEE Catalog No. 87CH2459-6), pp. 107-115. If the current exceeds the peak value commanded by the first threshold signal, but stays below a second threshold, current limiting is provided by the pulse-by-pulse peak-current-controlling method. If, however, the current exceeds the second threshold (a symptom of current runaway), the soft-start protection shuts down the converter and initiates a new soft start. With the PWM soft-start protection, this is an effective approach; it essentially eliminates most of the drawbacks of both the pulse-by-pulse and PWM soft-start schemes. The Signetics SE5560 PWM controller integrated circuit uses this approach.

However, with the peak-current-commanding soft-start protection, we cannot expect any improvement in the current-runaway phenomenon, because the circuit still suffers from the inherent delay between the turn-on of the switching element and the subsequent turn-off after detection of overcurrent. In that case, one must turn off the converter for a time long enough to allow the current in the filter inductor to drop sufficiently, and then initiate another soft start. It is inherently unsafe to depend on a peak-current-commanding soft-start scheme which programs the peak current to rise gradually at start-up. The absence of current runaway depends on a fortuitous combination of parasitic circuit parameters: inductor resistance; time delay of current sensor, controller, and switching element; and voltage drop in free-wheeling diode.

The object of the present invention is to provide protection from overcurrent under overload conditions, essentially free from the potentially destructive effects of current runaway described above.

SUMMARY OF THE INVENTION

The circuit of the present invention receives an output signal from a current sensor. A sample-and-hold circuit samples and holds the peak output signal from the current sensor. A comparator compares the output signal from the current sensor with a first threshold. If the signal exceeds that threshold, the comparator generates a signal to turn off the switching element of the power converter. A modulator amplifier coupled to the sample-and-hold circuit compares the output signal from the sample-and-hold circuit with a second threshold. In the case of short-circuit runaway, the current-sensor output signal continues to rise beyond the first threshold, as does the "held" peak value of that signal. If the "held" peak value reaches the second threshold, the modulator amplifier generates a signal for use in increasing the switching repetition period provided by the clock generator of a constant-frequency current limiter or in increasing the "off" time generated by the "off" pulse generator of a constant-"off"-time current limiter. In both cases, the minimum duty ratio of the switching element is thereby decreased.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
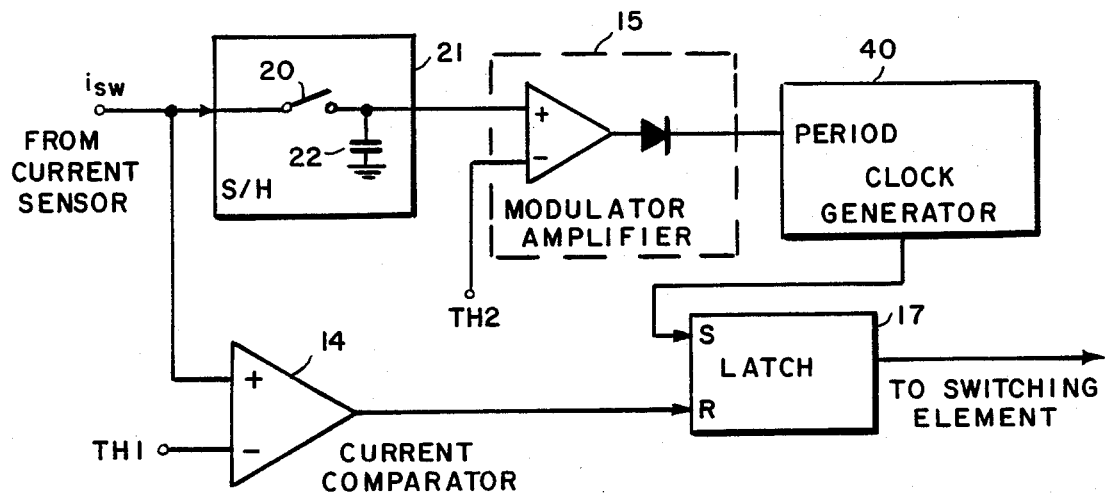
FIG. 1 is a block schematic representation of the circuit of the present invention for use with a constant-frequency current limiter.
Figure 2:
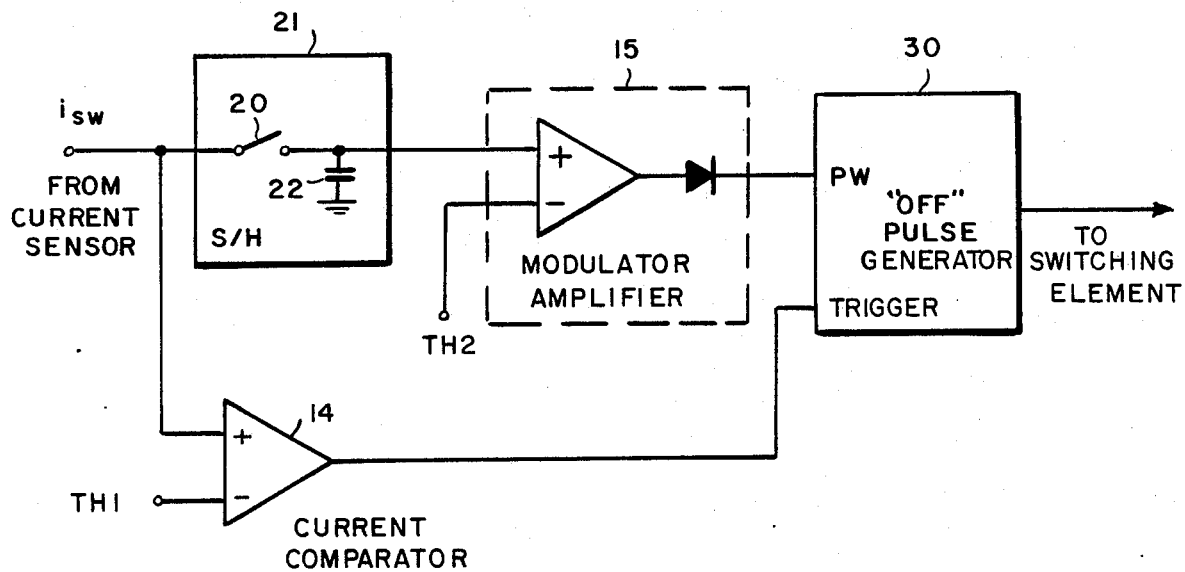
FIG. 2 is a block schematic representation of the circuit of the present invention for use with a constant-"off"-time current limiter.

Turning now to the drawings, in FIGS. 1 and 2, the signal $i_{SW}$ represents the instantaneous value of the current in the switching element, obtained from a current sensor which senses that current or the related inductor current. In current limiting or current regulation, or in current-mode control, of a voltage-regulated power converter that switch current is compared with the commanded first threshold signal, TH1. In current limiting or current regulation, TH1 represents the commanded value of the peak current. In current-mode control of a voltage-regulated power converter, TH1 is obtained from the output of the voltage-error amplifier. A current comparator 14 receives the $i_{SW}$ signal and the TH1 signal. If the instantaneous value of $i_{SW}$ exceeds the first threshold, the comparator 14 generates a command to turn off the switching element of the power converter. A latch 17 receives and forwards the command from the comparator 14 to the switching element in the case of the constant-frequency current-limiter application of FIG. 1. An "off" pulse generator 30 receives th command and forwards it to the switching element in the case of the constant-"off"-time current-limiter application of FIG. 2.

If the system is in the current-runaway condition, the current will continue to increase beyond the first threshold. A track-and-hold (T/H) or a sample-and-hold (S/H) circuit 21 monitors the output of the current sensor during each pulse of switch current, and holds the peak value. The sample and hold circuit typically includes a capacitor 22 which acts as the storage means on which the signal is held, and a switch 20 which connects the signal to the storage means at the proper time for sampling the peak signal. The switch 20 can be turned "on" and "off" by the output of the latch 17, for example. The output of the S/H circuit 21 is compared with a second threshold TH2 in a modulator amplifier 15. The second threshold TH2 is set higher than the first threshold by a significant amount, e.g., of the order of 10% of the current represented by TH1. If the peak value of the current exceeds the second threshold TH2, the converter is presumed to be suffering from current runaway. To counteract that runaway, the modulator amplifier 15 increases the switching repetition period provided by a clock generator 40 of a constant-frequency current limiter (FIG. 1) or increases the "off" time provided by the "off" pulse generator 30 of the constant-"off"-time current limiter (FIG. 2). The switching element is turned "on" at the beginning of the next period of the clock generator 40 (FIG. 1) or at the end of the "off" time determined by the "off" pulse generator (FIG. 2).

The clock generator 40 or the "off" pulse generator 30 can be the one normally used in the voltage or current regulator or the current limiter, or it can be a separate one which overrides the normally used one if the control signal TH1 has reached the maximum allowed value. That occurs, for example, in a current mode-controlled voltage regulator when the voltage-error amplifier saturates. That happens when the converter output voltage falls significantly below the regulated value, under overload conditions.

The modulator amplifier 15 is designed so that it has no effect on the clock generator 40 or the "off" pulse generator 30 if the peak current has not exceeded the second threshold. That ensures that the power converter will operate with the normal period (FIG. 1) or the normal "off" time (FIG. 2) unless the current exceeds the second threshold. That characteristic is shown symbolically in FIGS. 1 and 2 by the diode symbol at the output of the modulator amplifier 15.

The increased "off" time (for the constant-"off"-time protection method) or the increased period (for the constant-frequency protection method) decreases the minimum duty ratio of the switching element, even though the minimum "on" time of the switching element cannot be decreased. The net effect is an inherently safe protection. The short-circuit current is well-controlled, nearly equal to the designed value over the entire range of load resistance, free from the low-frequency oscillation associated with prior-art soft-star protection methods, and safe for the converter and the current-carrying wires, too.

Figure 3:
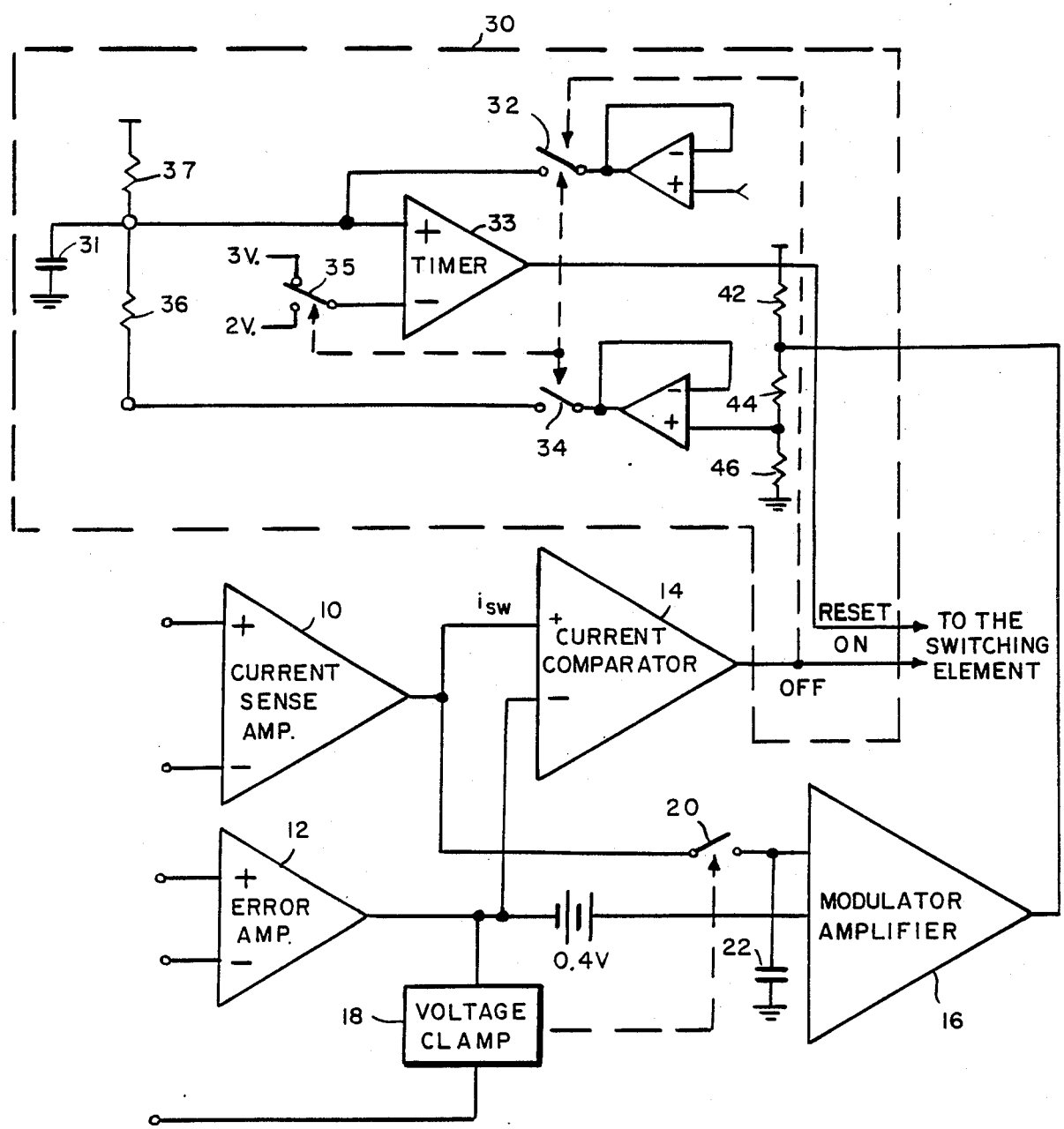
FIG. 3 is a block diagram of a preferred embodiment of the circuit of FIG. 2.

FIG. 3 is a block diagram showing a system as operated by a preferred embodiment of the circuit of FIG. 2 for protecting a power converter controlled by a constant-"off"-time current mode controller. A current-sense amplifier 10 of the current-mode controller receives a differential voltage proportional to the amount of current flowing in a switching element. This differential voltage is derived from a sensing resistor in series with the switching element or from any other appropriate current-sensing means. The differential voltage is amplified and supplied to a positive input of a comparator 14 of the current-mode controller. An error amplifier 12 of the current-mode controller receives a reference voltage and a signal related to the power supply output. The difference between these voltages develops a control signal that is applied to a negative input of the comparator 14 of the current-mode controller. The control signal from the error amplifier 12 is boosted by 0.4 of a volt to set a threshold. The threshold is applied to an inverting input of a modulator amplifier 16 of the present invention.

During regulation, the error amplifier 12 will demand more or less current as a function of the output voltage. If the output voltage decreases, e.g., due to an increase in loading, the control signal demands more current. A voltage clamp 18 in the current-mode controller prevents the error amplifier output from exceeding a request for maximum current. The clamp 18 provides a maximum control signal when maximum peak current is requested. The maximum peak current signal is provided to a switch 20 in the present invention which enables the non-inverting input of the modulator 16 to receive the output voltage signal from the current-sense amplifier 10.

The maximum "off" time is determined by an "off" pulse generator 30. At time equals zero, a timing capacitor 31 starts charging through a charging resistor 37. The switching element of the current-mode controller is on. When the monitored current reaches the first threshold level as determined by the comparator 14, comparator 14 changes state and turns off the output to the switching element. The "off" signal from the comparator 14 also quickly turns on a switch 32 in "off" pulse generator 30. This quickly charges the timing capacitor 31 toward 4 volts. When the capacitor 31 reaches 3 volts, it is at the top threshold of a timer 33. This causes timer 33 to change state, turning switch 32 off, closing switch 34, and switching switch 35 to the lower threshold of 2 volts. The resistor divider network set up by resistor 42, resistor 44, and resistor 46 puts one volt through switch 34. Thus, the capacitor 31 is now discharged through resistor 36 at a fixed rate. When the voltage on the timing capacitor 31 drops to 2 volts, the bottom threshold of the timer 33 is reached. The timer 33 switches state, opening switch 34 and returning switch 35 to the upper threshold of 3 volts. This is also when timer 33 provides a "on" signal to the output. Now the timing capacitor 31 starts charging again through charging resistor 37. The value of timing resistor 37 is chosen along with the value of capacitor 31 to limit the maximum "on" time of the output to the switching element. Under normal circumstances, comparator 14 will turn off the switching element before capacitor 31 is charged to 3 volts. If capacitor 31 is charged up to 3 volts before the output is turned off, then timer 33 will turn off the output to the switching element. This is a safety mechanism.

During an overload condition such as short circuit on a power supply's output terminals, the error amplifier 12 will demand the maximum current available to raise the output voltage. To limit the current to a safe level, the voltage clamp 18 limits the error amplifier control signal to a suitable level. During the overload condition, the voltage clamp 18 sends a signal to switch 20 enabling the modulator amplifier 16 to receive the output of the current-sense amplifier 10.

A voltage proportional to the sensed current now appears at the non-inverting input of the modulator amplifier 16. The present invention includes storage capacitor 22 which acts as part of a peak detector to hold the current-sense amplifier output voltage after the switching element has been switched off. This action of capacitor 22 maintains the appropriate peak voltage at the modulator amplifier input for producing the modulating voltage signal during the "off" time. During normal operation, when maximum peak current is not exceeded, the modulator amplifier 16 has no effect on the timing circuit. But with an overload condition, the modulator amplifier 16 acts as a differential amplifier. It compares the peak output voltage signal from the current-sense amplifier 10 with a second threshold voltage set at the inverting input by the error amplifier 12. The comparison is used to produce a modulating voltage. This modulating voltage signal from the modulator amplifier 16 is applied to the resistor divider made up of resistors 42, 44 and 46. As the peak output voltage from the current-sense amplifier 10 increases above the second threshold voltage, the modulating voltage increases. This translates into a higher voltage at switch 34 and subsequently results in a longer "off" time.

Figure 4:
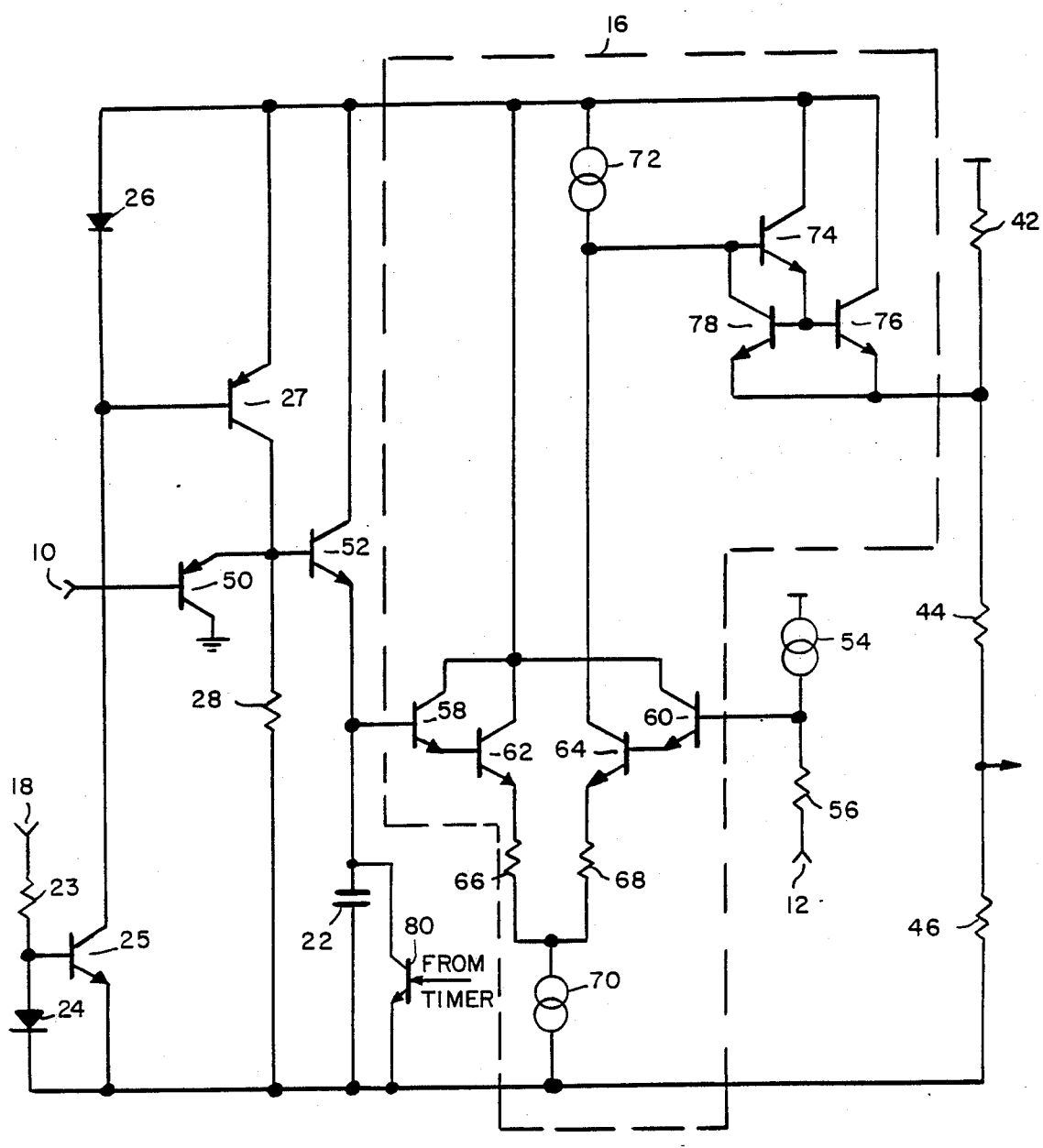
FIG. 4 is a schematic circuit diagram of the circuit of FIG. 3.

Referring now to FIG. 4, a more detailed schematic of the circuitry of the presently preferred embodiment is shown. Switch 20 from FIG. 3 is formed by transistor 25, transistor 27, diode 26 and diode 24. When a signal is received from voltage clamp 18 indicating that a maximum peak current is being requested, then that signal is provided through resistor 23 to the current mirror formed by diode 24 and transistor 25. The current mirrored in transistor 25 is pulled through diode 26 and is mirrored through transistor 27. The current through transistor 27 is provided through resistor 28 which biases transistors 50 and 52 on. Transistors 50 and 52 provide a buffer between the voltage output of the current sense amplifier 10 and the input to the modulator 16. A voltage proportional to the sensed current is provided by the current sense amplifier 10 to the base of transistor 50. Because of the cancelling effects of the base-emitter voltages of transistor 5 and transistor 52, the same voltage as that output by the current sense amplifier 10 appears at the input to the modulator amplifier 16. The peak output voltage from the current-sense amplifier 10 is held by capacitor 22. The modulator amplifier 16 is a fixed-gain differential transconductance amplifier whose output capability includes only sourcing current. The other input to the modulator 16 is connected to the first voltage threshold set by the output of the error amplifier 12 and a level-shifting network composed of current source 54 and resistor 56. In accordance with the presently preferred embodiment, current source 54 and resistor 56 provide a voltage valued so as to add 10% to the maximum value of the voltage signal provided by error amplifier 12.

The peak output voltage from the current-sense amplifier 10 is provided to the base of a transistor 58. The second voltage threshold from the error amplifier 12 is provided to the base of a transistor 60. The collectors of transistor 58 and transistor 60 are connected to one another. The emitter of transistor 58 connects to the base of a transistor 62. The emitter of transistor 60 is connected to the base of a transistor 64. The emitters of transistors 62 and 64 are connected through resistors 66 and 68, respectively, into a current source 70. A current source 72 is connected to the collector of transistor 64.

Under normal operating conditions when the maximum peak current is not being requested and the modulator amplifier 16 is not being enabled, transistor 64 is "on" and carries all the current from current source 72. When the maximum peak current signal from the voltage clamp 18 turns on the voltage signal from the current-sense amplifier 10, the modulator amplifier 16 compares that voltage to the second threshold voltage at the base of transistor 60. The second threshold is 10% over the maximum voltage at the error amplifier 12 as set in the presently preferred embodiment. When the voltage at the current sense amplifier 10 is equal to the second threshold, transistors 62 and 64 are equally on. Each of them pulls the same amount of current. Current source 70 provides a current equal to double the current provided by current source 72; thus when the peak output voltage from the current-sense amplifier 10 is equal to the second threshold voltage, equal currents are provided through transistor 62 and transistor 64, and those currents are equal to the amount of current provided by current source 72.

When the voltage at the base of transistor 58 begins to exceed the second threshold voltage, the current through transistor 64 drops below the current provided by current source 72 and thus some current is provided to the current multiplier formed by transistors 74, 76 and 78. These transistors provide that current into the resistor divider network which sets the timing voltage in the timing block 30. The current provided through resistor 44 and resistor 46 raise the timing voltage so as to slow the discharging of the timing capacitor 31 and lengthen the "off" time of the current-mode controller.

In accordance with the presently preferred embodiment, when the voltage at the base of transistor 58 reaches a third threshold voltage which is 20% above the maximum voltage level of the error amplifier 12, the current through transistors 74, 76 and 78 is maximized so that the timing voltage rises above 2 volts, thereby lengthening the "off" time towards infinity. It is less than infinite since capacitor 22 will eventually discharge below 4.8 volts.

It may be desirable to add a reset transistor 80 across the storage capacitor 22. The base of the reset transistor 80 receives the "on" signal from the timer in the "off" pulse generator 30. Thus, when the switching element is turned on, the capacitor 22 is reset to near zero volts. This ensures a cycle-by-cycle monitoring of the output current.

In the presently preferred embodiment, the voltage level of the error amplifier 12 is 4 volts when maximum peak current is demanded. Resistor 56 and current source 54 provide an additional 400 millivolts to provide a 10% margin between the maximum voltage level and the onset of the "off" time modulation.

Resistors 66 and 68 set the gain of the transconductance amplifier. These resistor values are selected in the presently preferred embodiment so that when the current-sense amplifier 10 has a voltage exceeding the maximum voltage by 20%, transistor 62 is fully on and all of the current from current source 72 is provided into the resistor divider network of resistor 42, 44, and 46. In the presently preferred embodiment, this second threshold is 4.8 volts.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claims.

We claim:

1. An overload protection circuit comprising:
   means for receiving an output signal from a current sensor;
   means for comparing the output signal with a first threshold and for generating a signal to turn off a switching element having a minimum duty ratio in a power converter when the output signal reaches the threshold;
   means for holding a peak output signal from said current sensor;
   means for comparing the held peak output signal with a second threshold, said second threshold being greater than said first threshold, and for generating an "off" signal when said held peak output signal exceeds the second threshold; and
   means responsive to said "off" signal for decreasing the minimum duty ratio of the switching element.

2. The overload protection circuit of claim 1 wherein said means responsive to said "off" signal comprises clock-generator means for causing said switching element to have an increased period in response to said "off" signal.

3. The overload protection circuit of claim 1 wherein said switching element normally has a constant "off" time and wherein said means responsive to said "off" signal comprises timing means for causing said "off" time to increase.

4. The overload protection circuit of claim 3 wherein said timing means comprises means for setting a timing voltage and means for changing said timing voltage in response to said "off" signal.

* * * * *